United States Patent [19]

Matsunaga et al.

[11] Patent Number: 5,179,634
[45] Date of Patent: Jan. 12, 1993

[54] SYSTEM FOR SYNTHESIZING NEW FUZZY RULE SETS FROM EXISTING FUZZY RULE SETS

[75] Inventors: Nobutomo Matsunaga, Maikata; Kazuaki Shoji, Kawasaki, both of Japan

[73] Assignee: Omron Corporation, Kyoto, Japan

[21] Appl. No.: 888,435

[22] Filed: May 28, 1992

Related U.S. Application Data

[63] Continuation of Ser. No. 509,156, Apr. 16, 1990, abandoned.

[30] Foreign Application Priority Data

Apr. 14, 1989 [JP] Japan .................................. 1-95880
Apr. 18, 1989 [JP] Japan .................................. 1-98358
Nov. 6, 1989 [JP] Japan .................................. 1-288219

[51] Int. Cl.⁵ .............................................. G05B 11/00
[52] U.S. Cl. ........................................ 395/75; 395/51; 395/61; 395/900
[58] Field of Search ................. 395/61, 900, 75, 51

[56] References Cited

FOREIGN PATENT DOCUMENTS 63-313224 12/1988 Japan .
1-9036 1/1989 Japan .
1-103704 4/1989 Japan .
1-103705 4/1989 Japan .
1-103706 4/1989 Japan .
1-103707 4/1989 Japan .
1-113574 5/1989 Japan .
1-206142 8/1989 Japan .

OTHER PUBLICATIONS

Procyk et al., "A Linguistic Self-Organizing Process Controller", *Automatica* vol. 5 pp. 15-30 Jan. 1979.
Gupta et al., "Controllability of Fuzzy Control Systems", *IEEE Trans, on Systems, Man and Cybernetics.* V. SMC-16 N. 4, Jul./Aug. 1986 pp. 576-582.
Nonlinear Automatic Control, Gibson, John E., Ph.D., McGraw-Hill Book Company; pp. 291-339.

*Primary Examiner*—Allen R. MacDonald
*Attorney, Agent, or Firm*—Dickstein, Shapiro & Morin

[57] ABSTRACT

A fuzzy rule generator for generating fuzzy rules, comprising: a selection unit for selecting two or more sets of rules from a plurality of basic sets of rules which may be stored in memory; and a control unit for generating a new set of rules by carrying out a synthetic arithmetic operation based on a predetermined set of rules for synthesis. This process of synthesis may simply consist of addition or subtraction. Thereby, a new set of rules can be easily generated by carrying out a simple arithmetic operation for each application. Therefore, generation and modification of rules are simplified and speeded up, with additional benefits arising from an efficient utilization of existing sets of rules. Further, by imposing a constraint on the newly synthesized set of rules manually, automatically or by a combination of both according to a predefined algorithm, it is possible not only to ensure the stability of the system but also to obtain desired control characteristics. If desired, the newly created sets of rules may be added to the library of the basic sets of fuzzy rules.

18 Claims, 19 Drawing Sheets

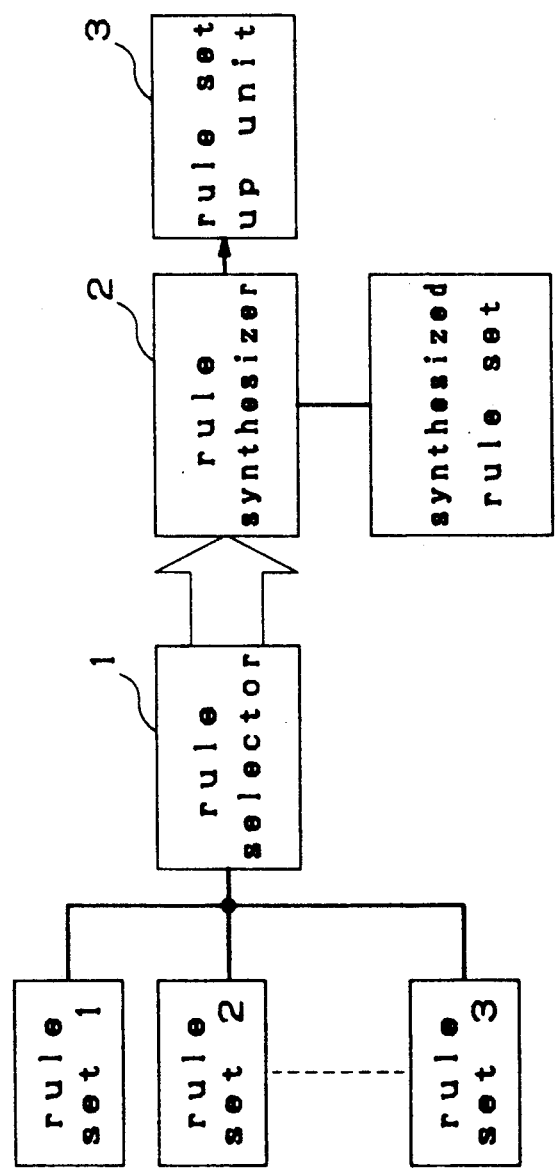

FIG. 2 (1)

|    | θ2 |    |    |    |    |    |    |
|----|----|----|----|----|----|----|----|
| θ1 | PL | PM | Ps | ZR | Ns | NM | NL |
| PL |    |    |    |    |    |    |    |
| PM |    | ZR |    |    | PM |    |    |
| Ps |    |    | ZR |    |    | PL |    |
| ZR |    |    |    | ZR |    |    |    |
| Ns |    | NL |    |    | ZR |    |    |
| NM |    |    | NM |    |    | ZR |    |
| NL |    |    |    |    |    |    |    |

FIG. 2 (2)

|    | θ2 |    |    |    |    |    |    |
|----|----|----|----|----|----|----|----|
| θ1 | PL | PM | Ps | ZR | Ns | NM | NL |
| PL |    |    |    |    |    |    |    |
| PM |    | PM |    |    |    |    |    |
| Ps |    |    |    |    |    | Ps | Ns |
| ZR |    |    |    | ZR |    |    |    |
| Ns |    | Ps | Ns |    |    |    |    |
| NM |    |    |    |    |    | PL |    |
| NL |    |    |    |    |    |    |    |

FIG. 3

| first rule set | second rule set |
|---|---|
| 1. if θ1=PM, θ2=PM then ZR | 1. if θ1=PM, θ2=PM then PM |
| 2. if θ1=PM, θ2=Ns then PM | 2. if θ1=Ps, θ2=Ns then Ps |
| 3. if θ1=Ps, θ2=Ps then ZR | 3. if θ1=Ps, θ2=NM then Ns |
| 4. if θ1=Ps, θ2=NM then PL | 4. if θ1=ZR, θ2=ZR then ZR |
| 5. if θ1=ZR, θ2=ZR then ZR | 5. if θ1=Ns, θ2=PM then Ps |
| 6. if θ1=Ns, θ2=PM then NL | 6. if θ1=Ns, θ2=Ps then Ns |
| 7. if θ1=Ns, θ2=Ns then ZR | 7. if θ1=NM, θ2=NM then PL |
| 8. if θ1=NM, θ2=Ps then NM | |
| 9. if θ1=NM, θ2=NM then ZR | |

FIG. 4

| | PL | PM | Ps | ZR | Ns | NM | NL |
|---|---|---|---|---|---|---|---|
| PL | PL | PL | PL | PL | PM | Ps | ZR |
| PM | PL | PL | PL | PM | Ps | ZR | Ns |
| Ps | PL | PL | PM | Ps | ZR | Ns | NM |
| ZR | PL | PM | Ps | ZR | Ns | NM | NL |
| Ns | PM | Ps | ZR | Ns | NM | NL | NL |
| NM | Ps | ZR | Ns | NM | NL | NL | NL |
| NL | ZR | Ns | NM | NL | NL | NL | NL |

FIG. 5

| | PL | PM | Ps | ZR | Ns | NM | NL |
|---|---|---|---|---|---|---|---|
| PL | PL | PL | PL | PL | PM | Ps | ZR |
| PM | PL | PL | PL | PM | Ps | ZR | Ns |
| Ps | PL | PL | PM | Ps | ZR | Ns | NM |
| ZR | PL | PM | Ps | ZR | Ns | NM | NL |
| Ns | PM | Ps | ZR | Ns | NM | NL | NL |
| NM | Ps | ZR | Ns | NM | NL | NL | NL |
| NL | ZR | Ns | NM | NL | NL | NL | NL |

FIG. 6

|  | θ₂ |  |  |  |  |  |  |
|---|---|---|---|---|---|---|---|
|  | PL | PM | Ps | ZR | Ns | NM | NL |
| PL |  |  |  |  |  |  |  |
| PM |  | PM |  |  | PM |  |  |
| Ps |  |  | ZR |  | Ps | PM |  |
| θ₁ ZR |  |  |  | ZR |  |  |  |
| Ns |  | NM | Ns |  | ZR |  |  |
| NM |  |  | NM |  |  | PL |  |
| NL |  |  |  |  |  |  |  |

FIG. 7

|  | PL | PM | Ps | ZR | Ns | NM | NL |
|---|---|---|---|---|---|---|---|
| PL |  |  |  |  |  |  |  |
| PM |  | NM |  |  | PM |  |  |
| Ps |  |  | ZR |  | Ps | PL |  |
| ZR |  |  |  | ZR |  |  |  |
| Ns |  | NL | Ns |  | ZR |  |  |
| NM |  |  | NM |  |  | NL |  |
| NL |  |  |  |  |  |  |  |

FIG.10 (1)
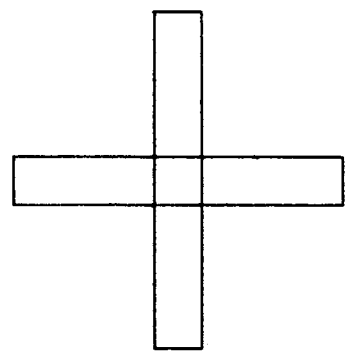
FIG.10 (2)
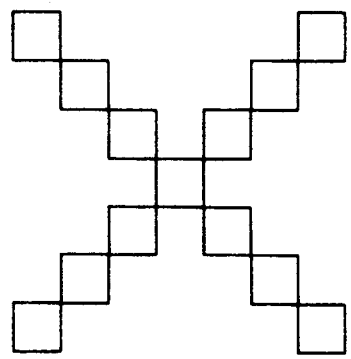
FIG.10 (3)
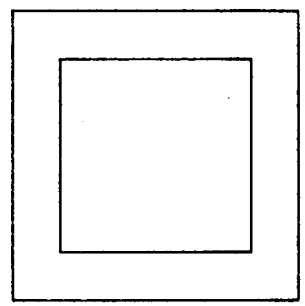
FIG.10 (4)
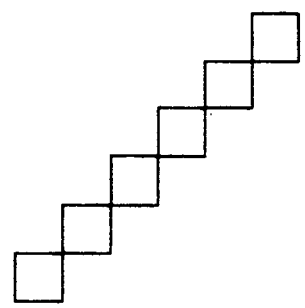
FIG.10 (5)
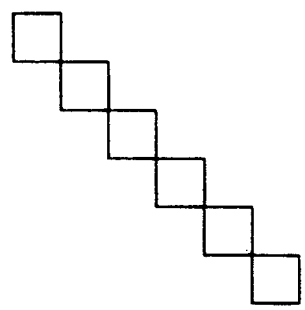
FIG.10 (6)
FIG.10 (7)
FIG.10 (8)
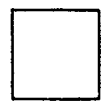

FIG.11

|  | θ2 |  |  |  |  |  |  |
|---|---|---|---|---|---|---|---|
|  | PL | PM | PS | ZR | NS | NM | NL |
| PL |  |  |  |  |  |  |  |
| PM |  |  |  |  |  |  |  |
| PS | PL |  | PS | ZR | NS |  | NL |
| θ1 ZR |  |  |  |  |  |  |  |
| NS |  |  |  |  |  |  |  |
| NM |  |  |  |  |  |  |  |
| NL |  |  |  |  |  |  |  |

|  | θ2 | | | | | | |
|---|---|---|---|---|---|---|---|
|  | PL | PM | Ps | ZR | Ns | NM | NL |
| PL |  |  |  |  | PM |  |  |
| PM |  |  |  |  | Ps |  |  |
| Ps |  |  |  |  | ZR |  |  |
| θ1 ZR |  |  |  |  | Ns |  |  |
| Ns |  |  |  |  | NM |  |  |
| NM |  |  |  |  | NL |  |  |
| NL |  |  |  |  | NL |  |  |

FIG.15

|  | θ2 | | | | | | |
|---|---|---|---|---|---|---|---|
|  | PL | PM | Ps | ZR | Ns | NM | NL |
| PL |  |  |  |  | PM |  |  |
| PM |  |  |  |  | Ps |  |  |
| Ps |  |  |  |  | ZR |  |  |
| θ1 ZR | PL | PM | Ps | ZR | Ns | NM | NL |
| Ns |  |  |  |  | NM |  |  |
| NM |  |  |  |  | NL |  |  |
| NL |  |  |  |  | NL |  |  |

| count<br>constraint | NL | NM | NS | ZR | PS | PM | PL |
|---|---|---|---|---|---|---|---|
| S | NL | NM | NS | ZR | PS | PM | PL |
| M | NL | NL | NM | ZR | PM | PL | PL |
| B | NL | NL | NL | ZR | PL | PL | PL | constraint                inclination α

SYSTEM FOR SYNTHESIZING NEW FUZZY RULE SETS FROM EXISTING FUZZY RULE SETS

This application is a continuation of application Ser. No. 07/509,156 filed Apr. 16, 1990, now abandoned.

TECHNICAL FIELD

The present invention relates to a fuzzy rule generator for generating new fuzzy rules according to existing sets of rules.

BACKGROUND OF THE INVENTION

According to the principle of fuzzy control, a predetermined set of rules are activated when an input signal is supplied to a fuzzy deduction unit, and the control action for the control object is determined by deduction according to the activated set of rules. The set of rules include a large number of fuzzy rules which are allocated for different control situations, and such fuzzy rules are typically expressed in the form of if-then statements.

Conventionally, generation of such fuzzy rules were conducted for each specific application, and it was necessary to create and modify new fuzzy rules for each new application. However, the need to create and modify fuzzy rules for each new application is highly cumbersome to the system operator, and a considerable amount of work is imposed upon the operator. Further, existing sets of rules were activated only for certain specific applications, and were not effectively utilized for creation of new sets of rules.

It is therefore preferred to be able to create a new set of rules for each new application according to existing sets of rules. However, such a process of creation would be highly cumbersome for the system operator who sets each new created fuzzy rule on a deduction unit one by one by means of a man-machine interface.

Also, since there is no standardized algorithm for defining a set of fuzzy rules which allows a fair estimation of the stability of the control process and the control performance as opposed to the case of conventional linear control systems, system designers had to depend much on trial and error processes. Therefore, not only much experience would be required to set up fuzzy rules but also a considerable time would be necessary for their set up and adjustment.

BRIEF SUMMARY OF THE INVENTION

In view of such problems of the prior art, a primary object of the present invention is to provide a fuzzy rule generator which allows existing sets of rules to be effectively utilized if any such sets of rules indeed exist, and simplifies the work of creating and modifying fuzzy rules by generating or synthesizing new sets of rules by making use of existing sets of rules.

A second object of the present invention is to provide a fuzzy rule generator which ensures generation of rational sets of fuzzy rules free from conflicting fuzzy rules.

A third object of the present invention is to provide a fuzzy rule generator which allows fuzzy rules to be generated more or less automatically, and yet ensures a satisfactory control performance.

A fourth object of the present invention is to provide a fuzzy rule generator which allows the system operator to obtain desired control characteristics and system stability.

These and other objects of the present invention can be accomplished by providing a fuzzy rule generator for generating fuzzy rules, comprising: selection means for selecting two or more sets of rules from a plurality of basic sets of rules; and computing means for generating a new set of rules by carrying out a synthetic arithmetic operation based on a predetermined set of rules for synthesis. The synthetic arithmetic operation may consist of either addition or subtraction. Preferably, the basic sets of rules are stored in storage means forming a part of the fuzzy rule generator.

Since a new set of rules are generated by making use of two or more selected basic sets of rules for each new application, the work of creating and modifying rules is simplified, and existing sets of rules are effectively utilized. Furthermore, by accumulating the newly generated sets of rules in the storage means, they also may be effectively utilized for synthesizing new sets of rules in future applications. Also, even when the sets of basic rules contain mutually conflicting rules, as they may be appropriately modified during the process of synthesis according to a prescribed rule, destruction of the basic characteristics of the sets of rules are avoided during the process of synthesis.

To cope with situations where the basic sets of rules have mutually conflicting rules, the rule generating means may be provided with a function to modify one of the basic sets of rules according to a prescribed rule when the basic sets of rules include conflicting rules. In particular, it is highly desirable to impose a constraint on the synthesized set of fuzzy rules so as to ensure a stability of the control object. This can be accomplished strictly manually or, alternatively, at least partly automatically by making use of a Liapunov function defined for its control object, and modifying the synthesized set of rules so as to ensure stability to its control object. Since a Liapunov function normally gives only a sufficient condition for stability, it is preferred to use additional manual input means for allowing the synthesized set of rules to be manually modified so as to obtain a desired control property within a range of fuzzy rules ensuring a stability to its control object.

Thus, various benefits can be obtained from efficient utilization of existing sets of fuzzy rules while eliminating the possibility of inadvertently creating an unstable control system, and the reliability of the fuzzy rule generator can be improved.

BRIEF DESCRIPTION OF THE DRAWINGS

Now the present invention is described in the following with reference to the appended drawings, in which:

FIG. 1 is a block diagram showing a conceptual structure of a first embodiment of the fuzzy rule generator according to the present invention;

FIGS. 2(1) and 2(2) are diagrams illustrating two basic sets of rules in the form of matrices;

FIG. 3 is a table showing the two sets of basic rules in the form of if-then statements;

FIG. 4 is a diagram showing a set of addition rules used for synthesizing fuzzy rules;

FIG. 5 is a diagram showing a set of subtraction rules used for synthesizing fuzzy rules;

FIG. 6 is a diagram showing a new set of fuzzy rules synthesized from the sets of rules shown in FIGS. 2(1) and 2(2) according to the addition rules given in FIG. 4;

FIG. 7 is a diagram showing a new set of fuzzy rules synthesized from the sets of rules shown in FIGS. 2(1)

Figures 8, 9:
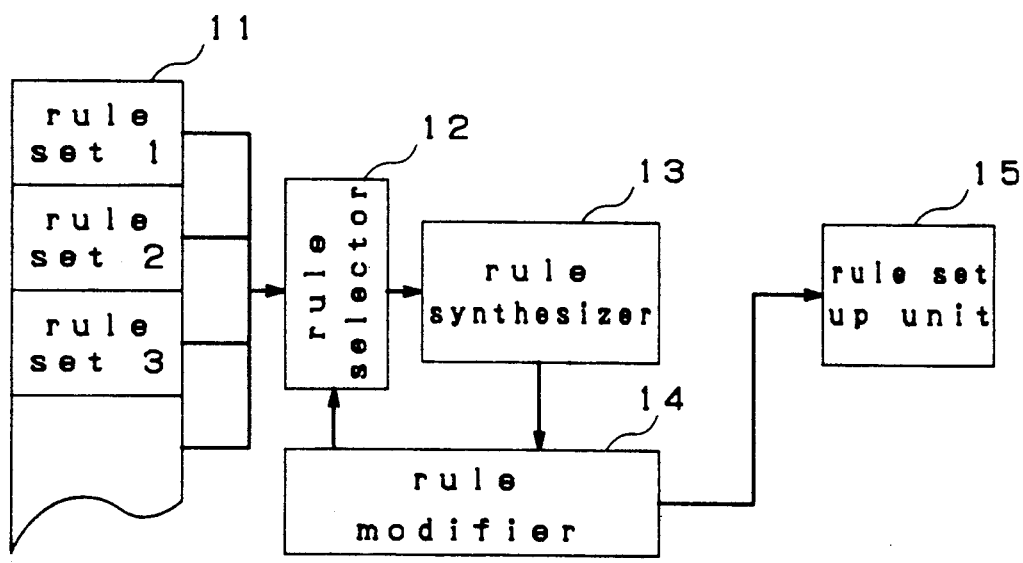
Figure 16:
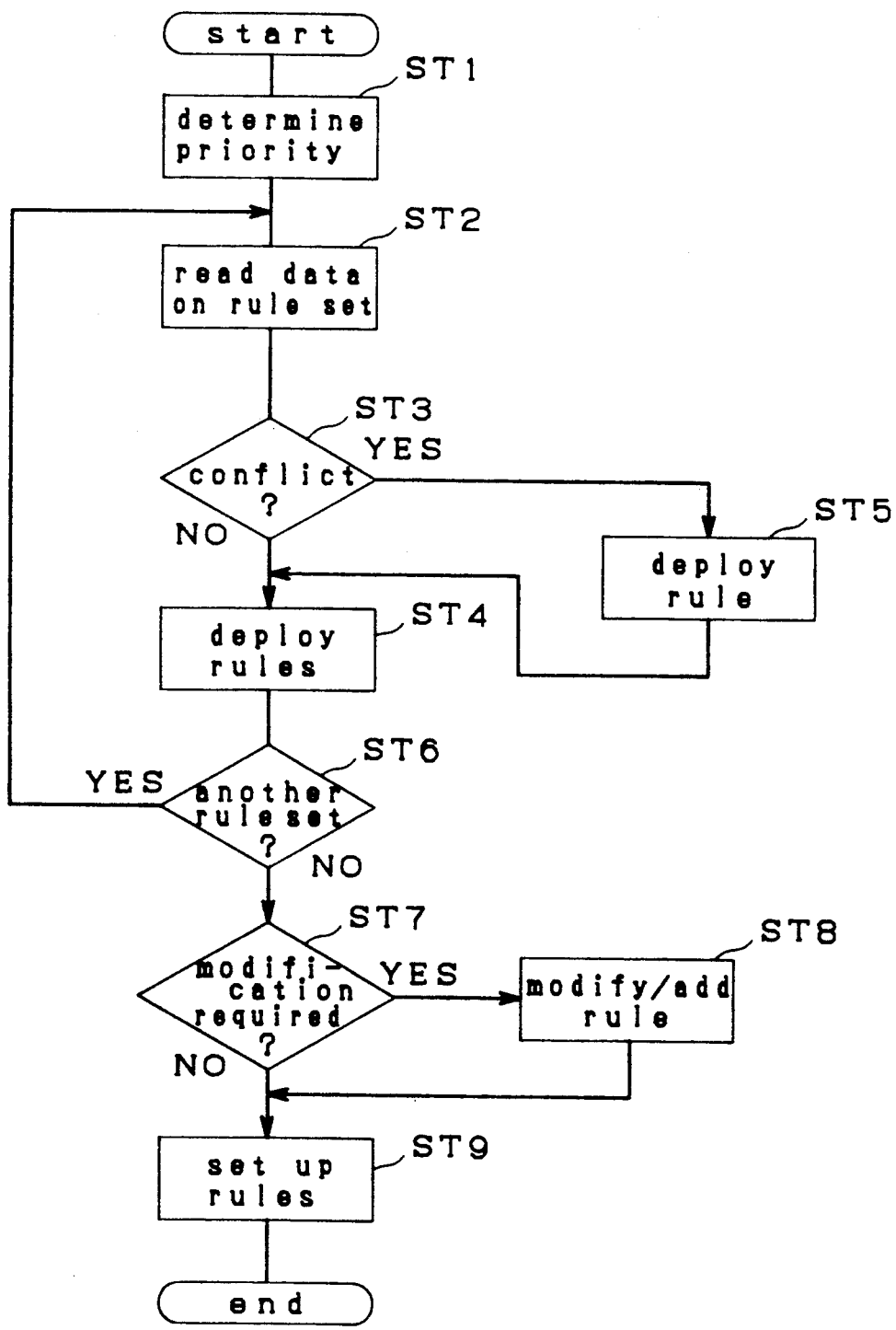
Figure 17:
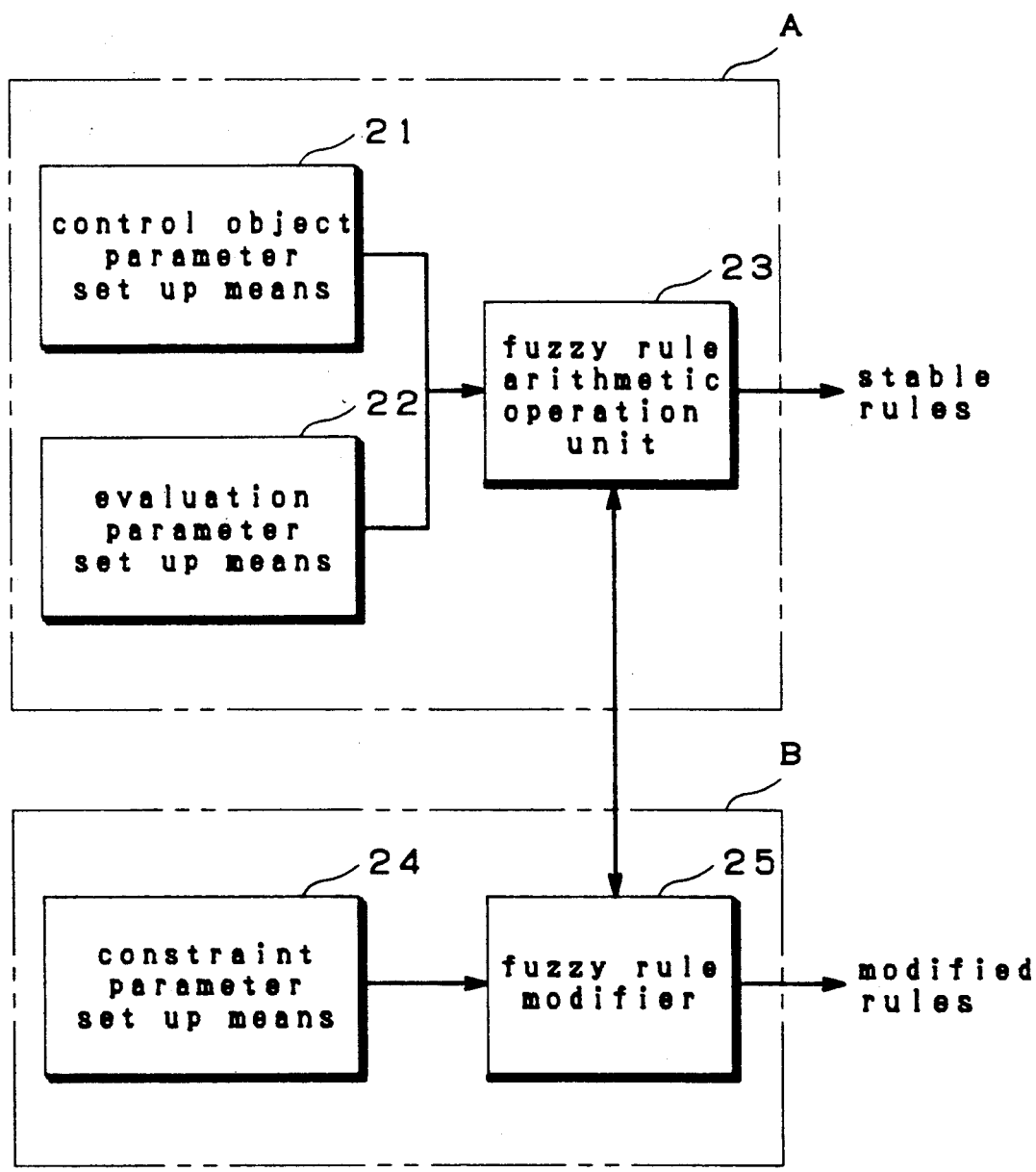
Figure 18:
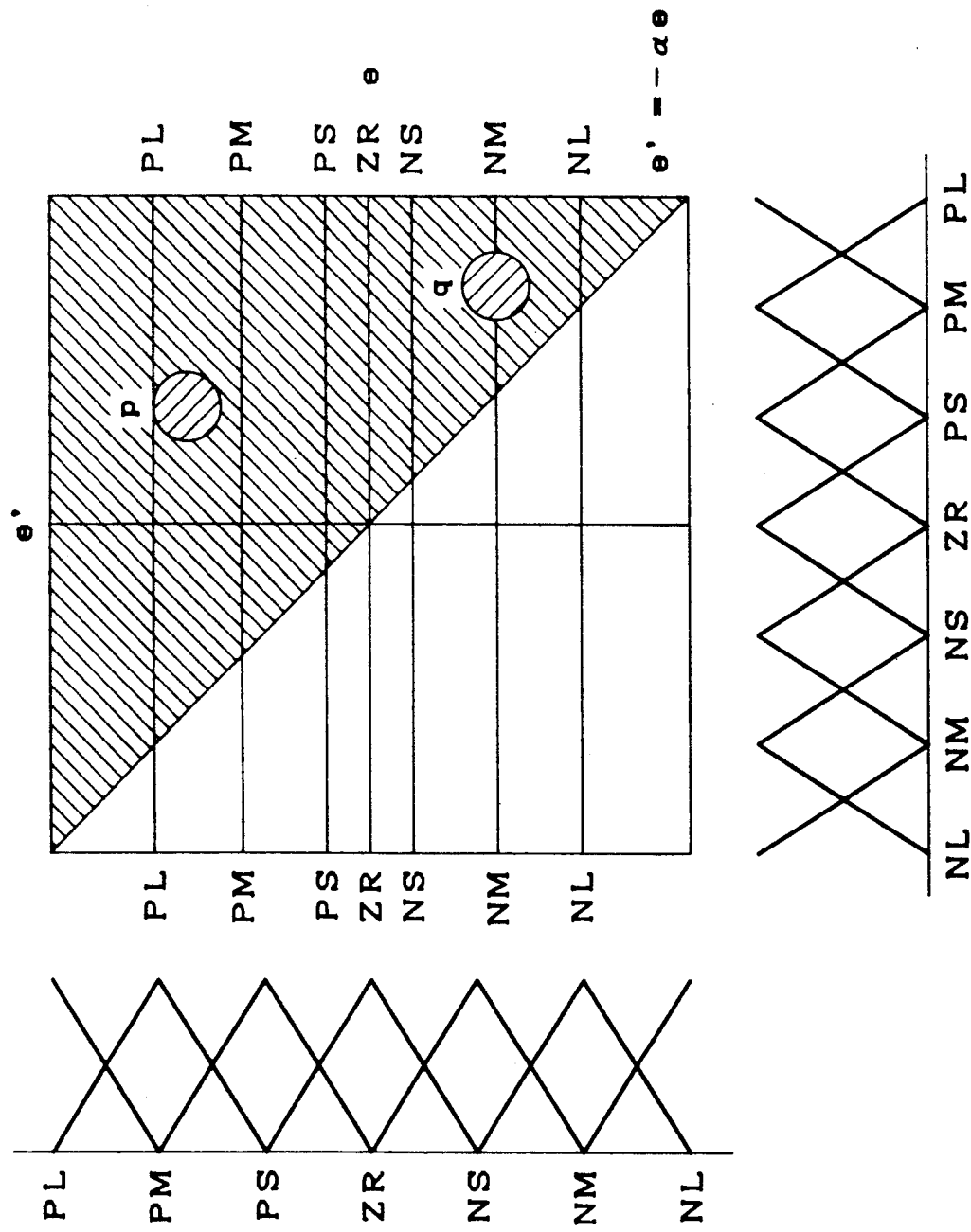
Figure 19:
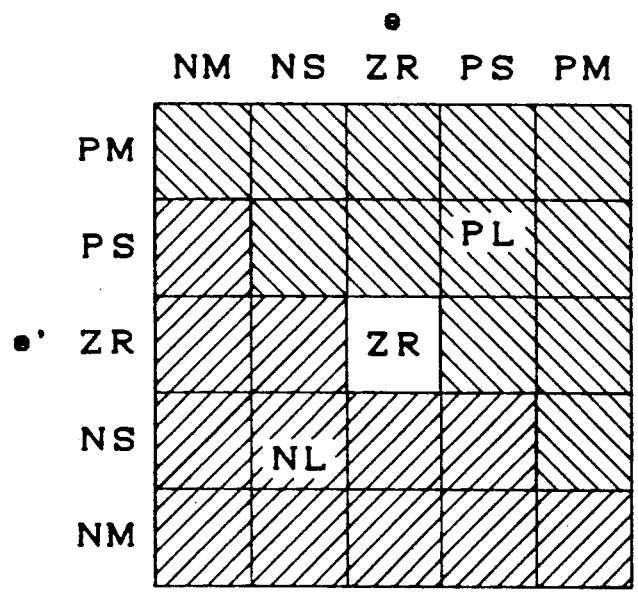
Figure 20:
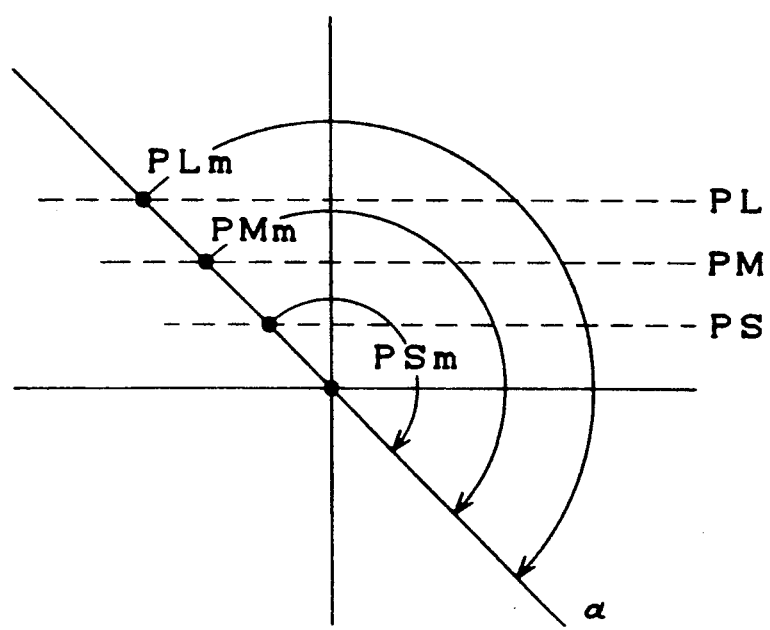
Figures 21, 22:
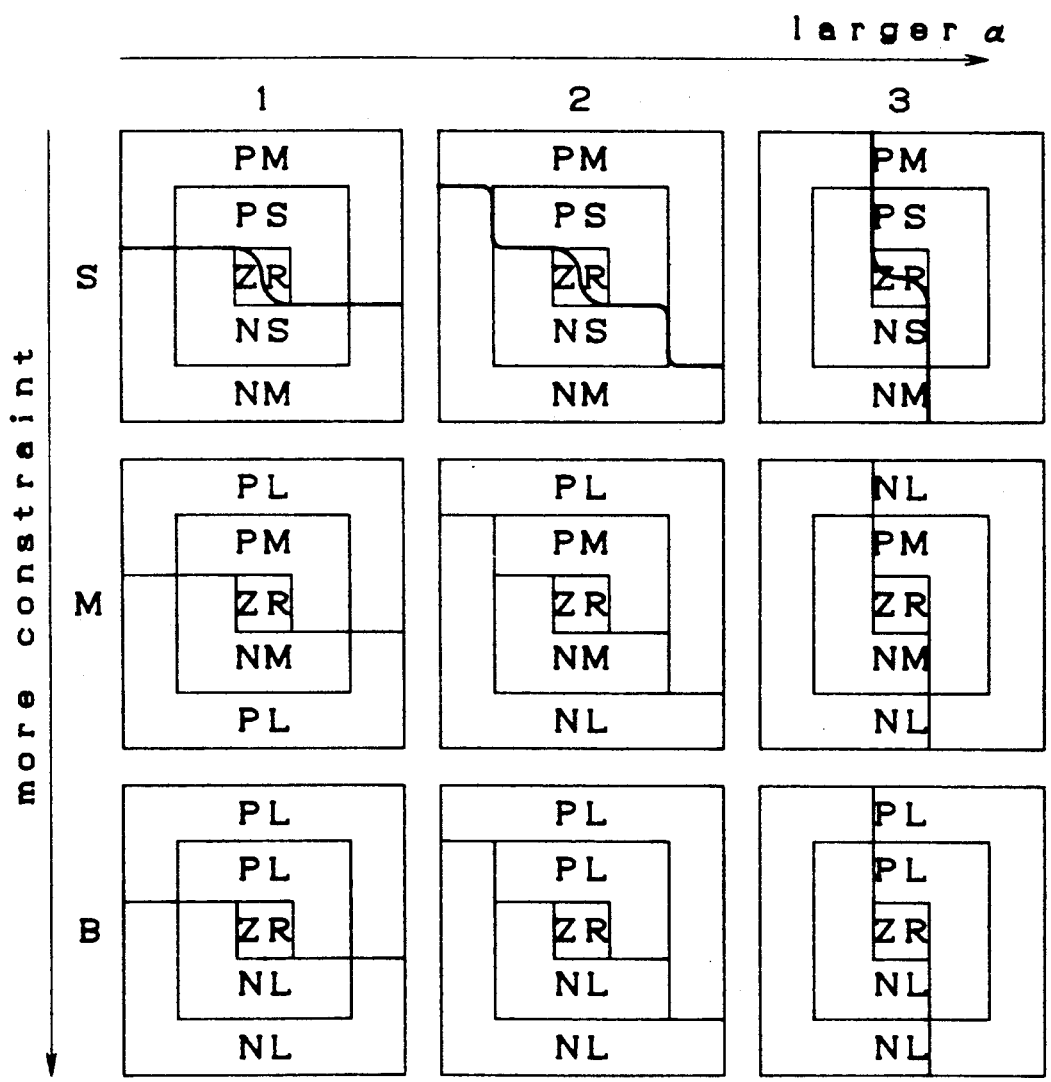
Figure 23:
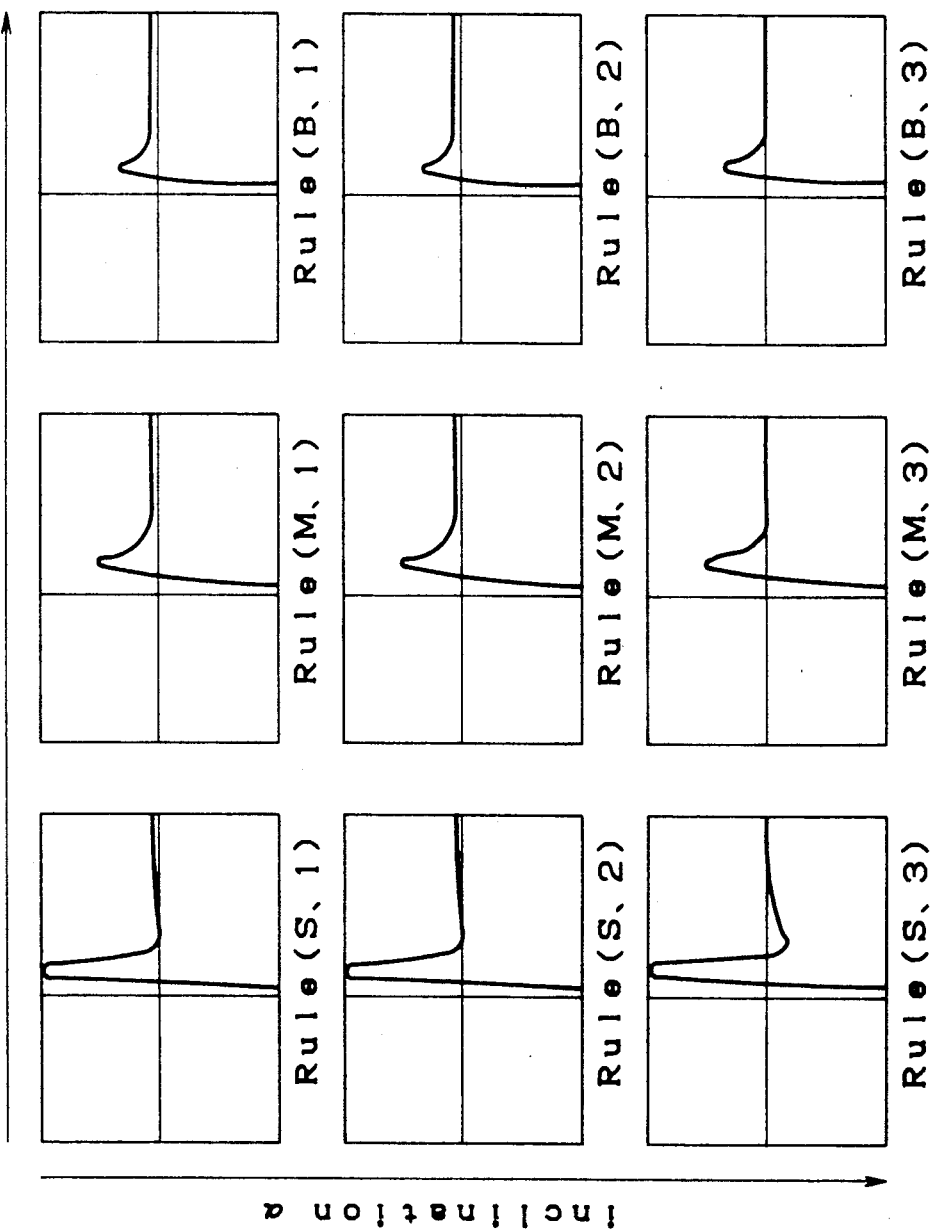
Figure 24:
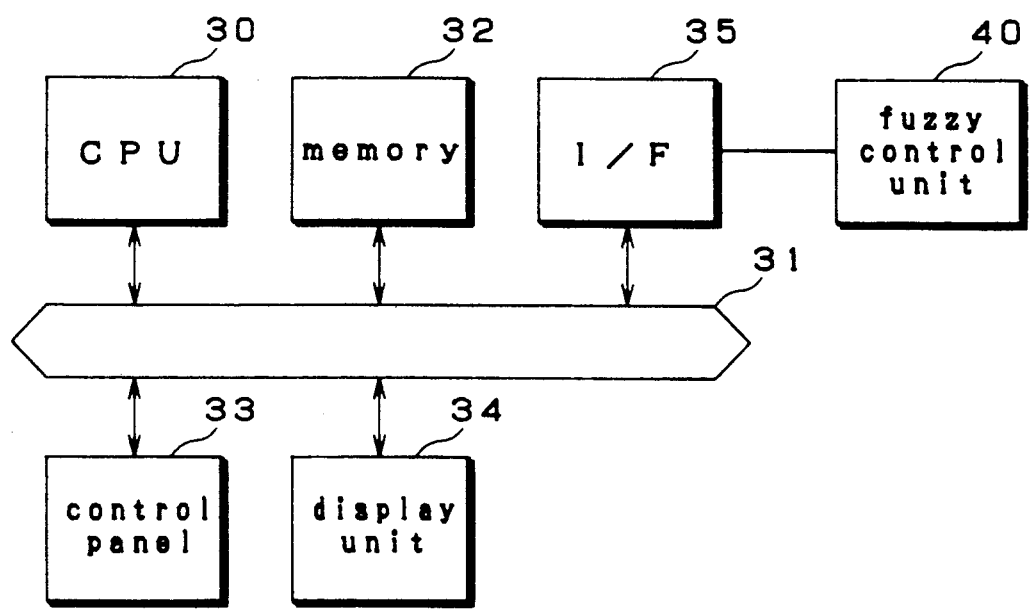
Figure 24:
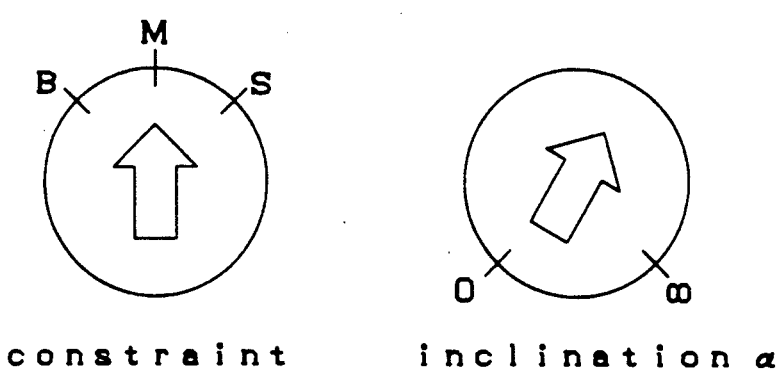
Figure 25:
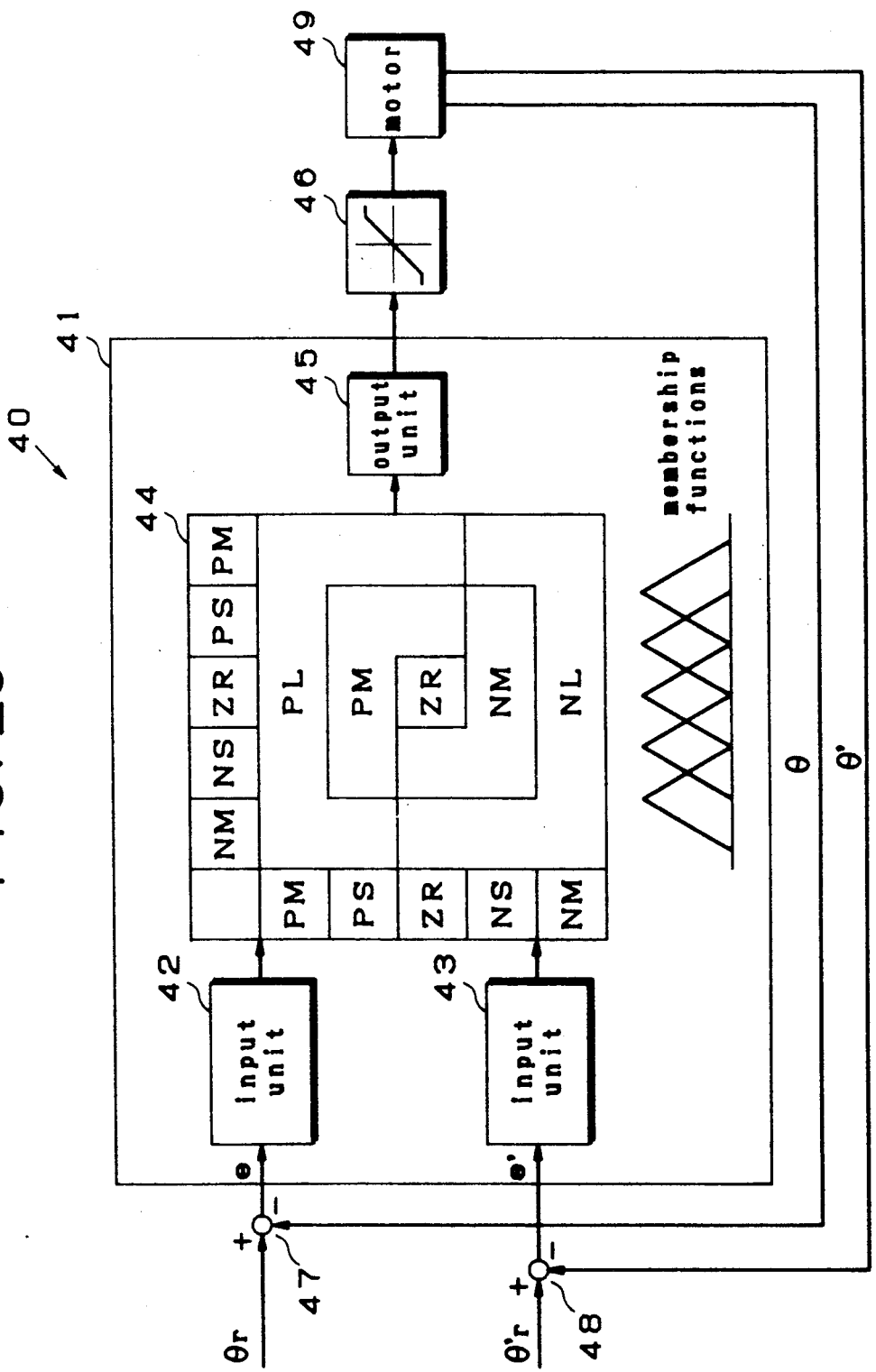
Figure 26:
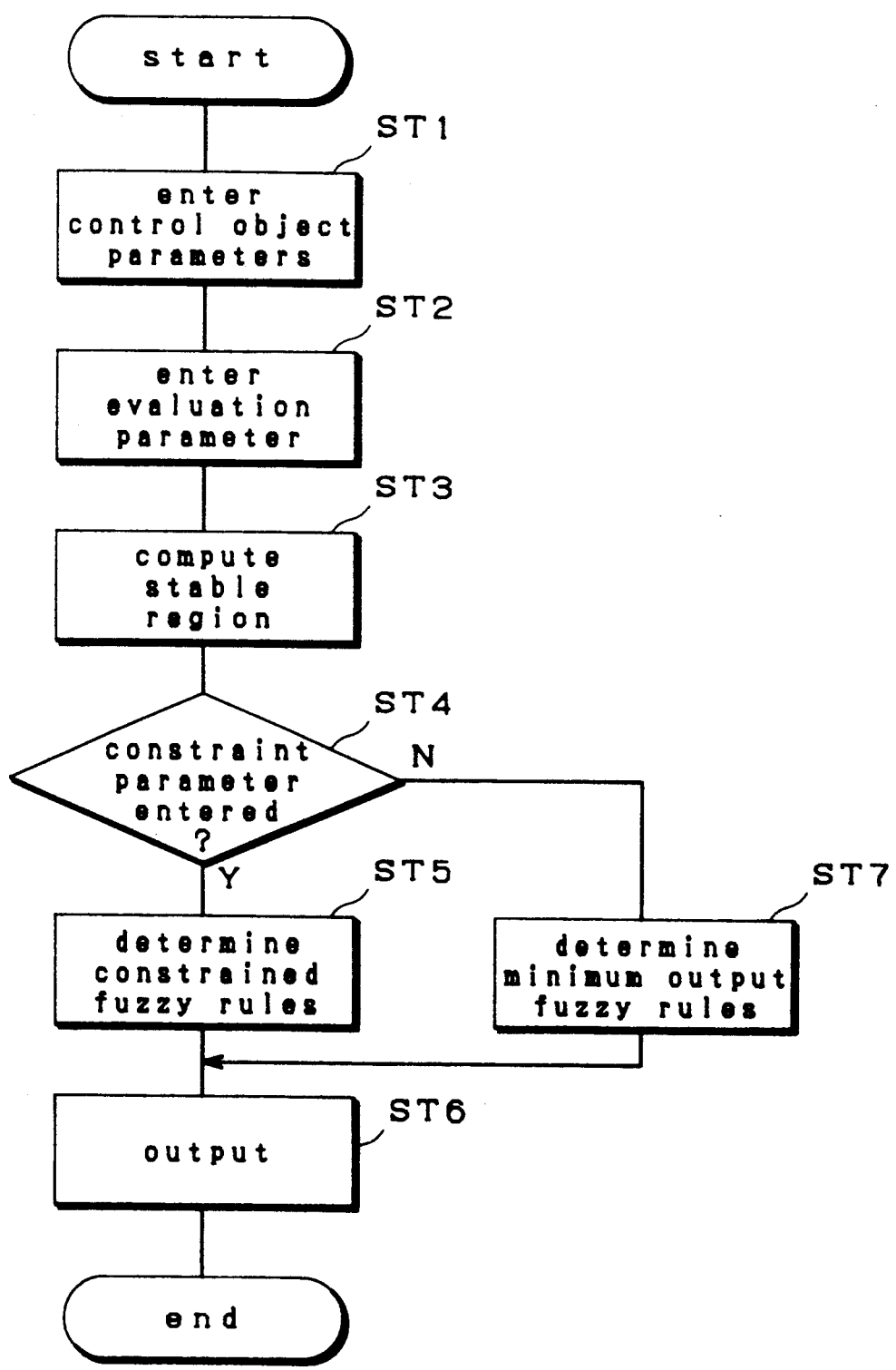

and 2(2) according to the subtraction rules given in FIG. 5;

FIG. 8 is a block diagram showing a conceptual structure of a second embodiment of the fuzzy rule generator according to the present invention;

FIG. 9 is a diagram showing the form of the sets of rules that are handled by the fuzzy rule generator;

FIGS. 10(1) through 10(8) are diagrams showing various patterns of the sets of fuzzy rule;

FIG. 11 is a diagram showing an example of a set of fuzzy rules;

Figures 12, 13:
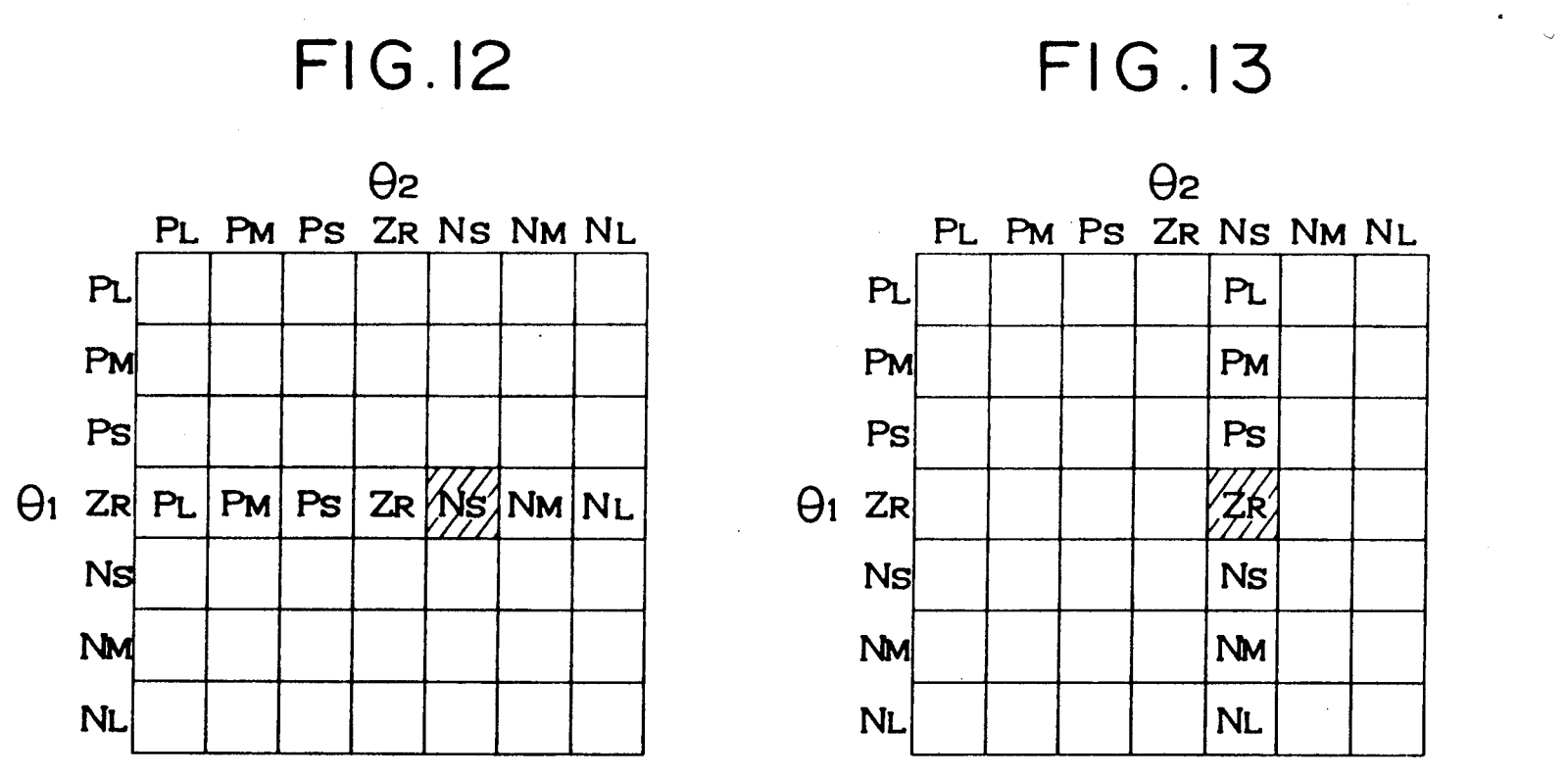

FIGS. 12 and 13 are diagrams showing sets of fuzzy rules serving as a oasis for fuzzy rule synthesis;

FIG. 14 is a diagram of a set of fuzzy rules modified from the set of fuzzy rules given in FIG. 13;

FIG. 15 is a diagram showing a synthesized set of rules according to the second embodiment of the present invention;

FIG. 16 is a flow chart showing the process of fuzzy rule synthesis according to the second embodiment of the present invention;

FIG. 17 is a functional block diagram of a third embodiment of fuzzy rule generator according to the present invention;

FIG. 18 is a diagram depicting a fuzzy rule matrix plane;

FIG. 19 is a diagram of an example of constraint imposed upon a set of fuzzy rules;

FIG. 20 is a diagram showing an example of how constraint on a set of fuzzy rules may be modified;

FIG. 21 is an example of a map table for designating constraint that is to be imposed on a set of fuzzy rules;

FIG. 22 shows various fuzzy rule patterns having different levels of constraint;

FIG. 23 shows step responses obtained by the corresponding sets of rules having different constraint conditions as given in FIG. 22;

FIG. 24(A) is a block diagram of the hardware structure of the third embodiment of the fuzzy rule generator according to the present invention;

FIG. 24(B) is a front view of an operation panel for manually setting up parameters on the fuzzy rule generator shown in FIG. 24(A);

FIG. 25 is a block diagram of a fuzzy control unit using the set of fuzzy rules generated by the fuzzy rule generator; and FIG. 26 is a flow chart showing the process of generating a set of fuzzy rules with the third embodiment of the fuzzy rule generator according to the present invention.

DETAILED DESCRIPTION OF THE PREFERRED EMBODIMENTS

FIG. 1 shows an overall structure of an embodiment of the fuzzy rule generator according to the present invention, and this rule generator comprises a rule selector 1, a synthesizer 2, and a rule set up unit 3.

The rule selector 1 selects two or more sets of rules that are going to be used as a basis for a synthetic process from n number of sets of rules. The synthesizer 2 carries out a synthetic arithmetic operation on the sets of rules selected by the rule selector 1, and creates a new set of rules. The rule set up unit 3 sets up the new set of rules created by the synthesizer 2 on a fuzzy deduction unit (not shown in the drawings).

According to this embodiment, the rule selector 1 selects two sets of rules, and the synthesizer 2 extracts those fuzzy rules which contain applicable conditions and creates a new set of rules by carrying out addition and/or subtraction according to predetermined addition or subtraction rules.

FIGS. 2 (1) and (2) show two sets of rules selected by the rule selector 1 in the form of matrices. The first and second sets of rules each define what actions to be taken for inputs $\theta 1$ and $\theta 2$. For instance, according to the first set of rules shown in FIG. 2(1), an output u is to be ZR when one of the inputs $\theta 1$ is PM and the other input $\theta 2$ is PM. Here, PM and ZR are fuzzy labels which consist of seven kinds: PL (positive large), PM (positive medium), PS (positive small), ZR (zero), NS (negative small), NM (negative medium), and NL (negative large).

FIG. 3 shows the first set of rules on the left side and the second set of rules on the right side in a table each in the form of if-then statements. According to this table, the first set of rules contain 9 fuzzy rules while the second set of rules contain 7 fuzzy rules. When the first and second sets of rules are selected by the rule selector 1, the synthesizer 2 reads out data related to the fuzzy rules included in the sets of rules to carry out a synthetic arithmetic operation thereon either according to the addition rule shown in FIG. 4 or according to the subtraction rule shown in FIG. 5.

These addition and subtraction rules serve as the rules for carrying out a synthetic arithmetic operation consisting of addition or subtraction as the case may be, and FIGS. 4 and 5 summarize these rules in the form of matrices.

In these drawings, each intersection of labels selected from the column of labels a on the left side and the row of labels b on the upper side of each of the tables gives the label of the output u which is to be a result of addition or subtraction. In FIG. 4 the intersection of each combination of vertical and lateral labels indicates a result of a synthetic arithmetic operation based on addition in the form of a label, and in FIG. 5 the intersection of each combination of vertical and lateral labels indicates a result of a synthetic arithmetic operation based on subtraction in the form of a label. For instance, in FIG. 4, when a synthetic arithmetic operation based on addition is carried out on label PM and label PM, the label of the result of the arithmetic operation is given by PL.

Suppose that a synthetic arithmetic operation based on addition is carried out on the first and second sets of rules. First of all, those fuzzy rules having common conditions are extracted from the two sets of rules. In the case of the first and second sets of rules shown in FIG. 3, the first fuzzy rule of the first set and the first fuzzy rule of the second set have a common condition. Likewise, the fourth and the third, the fifth and the fourth, the sixth and the fifth, and the ninth and the seventh of the first set and second set, respectively, have a common condition for each of the matching pairs, and these five pairs of fuzzy rules can thus be extracted.

For instance, when an arithmetic operation based on the addition rules of FIG. 4 is carried out on the first fuzzy rule of the first set and the first fuzzy rule of the second set, since the outputs u for these fuzzy rules are given by ZR and PM, respectively, a new label PM is determined as a result of the synthetic arithmetic operation. When similar arithmetic operations are carried out on the subsequent four pairs of the rules, new labels PM, ZR, NM and PL are obtained.

FIG. 6 summarizes a new set of rules which are thus generated by carrying out synthetic arithmetic operations based on addition, in the form of a matrix. In this drawing, the shaded areas represent the labels obtained by the synthetic arithmetic operations. The remaining labels correspond to those not having common conditions, and, in this case, the label of the output of each of such fuzzy rules is used as it is.

Thus, the new set of rules generated or synthesized from the first and second sets of rules may be expressed in the form of if-then statements as given in the following:

1. if $\theta1$=PM and $\theta2$=NS, then PM
2. if $\theta1$=PS and $\theta2$=PS, then ZR
3. if $\theta1$=NS and $\theta2$=NS, then ZR
4. if $\theta1$=NM and $\theta2$=PS, then NM
5. if $\theta1$=PS and $\theta2$=NS, then PS
6. if $\theta1$=NS and $\theta2$=PS, then NS
7. if $\theta1$=PM and $\theta2$=PM, then PM
8. if $\theta1$=PS and $\theta2$=PM, then PM
9. if $\theta1$=ZR and $\theta2$=ZR, then ZR
10. if $\theta1$=NM and $\theta2$=PM, then NM
11. if $\theta1$=NM and $\theta2$=NS, then PM In this new set of rules, the first through fourth fuzzy rules are related to the first set of rules, the fifth and sixth fuzzy rules are related to the second set of rules, and the seventh through eleventh rules are obtained by synthetic arithmetic operation.

The set of rules thus generated are sent to the rule set up unit 3, and a certain set up operation is carried out at the fuzzy deduction unit.

Although a new set of rules were generated by an arithmetic operation based on addition in the above described embodiment, it is also possible to carry out a similar synthetic arithmetic operation based on subtraction according to the subtraction rules given in FIG. 5. FIG. 7 summarizes a new set of rules which were generated by carrying out such a synthetic arithmetic operation based on subtraction in the form of a matrix, and the shaded areas in this table represent the labels obtained by the synthetic arithmetic operations. Also, although a new set of rules were generated by combining two sets of rules in the above described embodiment, it is possible to combine three or more sets of rules as can be readily understood.

Although synthetic arithmetic operations based on subtraction or addition were used in the above described embodiment, it is also possible to use other arithmetic operations such as MAX arithmetic operation and MIN arithmetic operation.

Since the present embodiment provides a rule generator for generating fuzzy rules, comprising: selection means for selecting two or more sets of rules from a plurality of basic sets of rules; and computing means for generating a new set of rules by carrying out a synthetic arithmetic operation based on rules for synthesis, a new set of rules can be easily generated by carrying out a simple arithmetic operation for each application. Therefore, generation and modification of rules are simplified and speeded up, with additional benefits arising from an efficient utilization of existing sets of rules.

FIG. 8 shows a general structure of a second embodiment of the fuzzy rule generator according to the present invention, and this rule generator comprises a storage unit 11, a rule selector 12, a rule synthesizer 13, a rule modifier 14, and a rule set up unit 15. The storage unit 11 stores a plurality of basic sets of rules. The rule selector 12 selects two or more basic sets of rules serving as a basis for a subsequent process of synthesis from the storage unit 11, and supply them to the rule synthesizer 13.

The rule synthesizer 13 synthesizes a desired set of rules by using the basic sets of rules selected by the rule selector 12 according to a prescribed rule. This rule synthesizer 13 has a function to modify one of the sets of rules according to a prescribed rule when the sets of basic rules serving as a basis for the process of synthesis contain mutually conflicting rules. The rule modifier 14 carries out modification of the set of rules generated by the rule generator 13 and add rules thereto as required. The rule set up unit 15 sets up the new set of rules generated by the rule synthesizer 13 and the rule modifier 14 on a fuzzy deduction unit (not shown in the drawings).

FIG. 9 shows the format of the sets of basic rules that are to be initially stored in the storage unit 11. In this drawing, two inputs $\theta1$ and $\theta2$ are indicated on the left side and the upper end, respectively, as fuzzy labels. The intersection of each combination of vertical and horizontal labels gives an output u defining what action should be taken in the form of a fuzzy label. In the present case also, there are seven fuzzy labels consisting of PL (positive large), PM (positive medium), PS (positive small), ZR (zero), NS (negative small), NM (negative medium), and NL (negative large).

FIGS. 10(1) through 10(8) show examples of the sets of basic rules which are stored in the storage unit 11 in advance. Each set of basic rules are characterized by the pattern of fuzzy labels of the output as listed in the matrix of FIG. 2: the pattern of FIG. 10(1) has the shape of vertical and horizontal lines crossing each other; the pattern of FIG. 10(2) has the shape of a pair of oblique lines crossing each other; the pattern of FIG. 10(3) has the shape of a rectangular ring; the pattern of FIG. 10(4) has the shape of a leftwardly slanting line; the pattern of FIG. 10(5) has the shape of a rightwardly slanting line; the pattern of FIG. 10(6) has the shape of a horizontal line; the pattern of FIG. 10(7) has the shape of a vertical line; and the pattern of FIG. 10(8) has the shape of a rectangular block.

Thus, the storage unit 11 stores an output pattern (shape) and the contents of fuzzy labels (components) for each set of the basic rules.

FIG. 11 shows an example of a set of rules having the pattern shown in FIG. 10(6). In this set of basic rules, one of the inputs $\theta1$ is fixed to PS, and the rules in this set may be expressed in the form of if-then statements given in the following:

if $\theta1$=PS and $\theta2$=PL, then PL
if $\theta1$=PS and $\theta2$=PS, then PS
if $\theta1$=PS and $\theta2$=ZR, then ZR
if $\theta1$=PS and $\theta2$=NS, then NS
if $\theta1$=PS and $\theta2$=NL, then NL In these fuzzy rules, the labels of the results correspond to the components of the basic rules, and, if the condition of the input $\theta1$ is given by PS and it is expressed by M(PS), this set of basic rules may be expressed as M(PS,v1) where v1 represents the rule components).

Referring to FIG. 8, the rule selector 12 of the present embodiment selects two sets of basic rules and supply them to the rule synthesizer 13 which synthesizes a desired set of rules from these two sets of basic rules according to a prescribed rule.

FIGS. 12 and 13 summarize two sets of basic rules selected by the rule selector 12 in the form of matrices, in which the set of rules of FIG. 12 is of the type illustrated in FIG. 10(6), and the set of rules of FIG. 13 is of the type illustrated in FIG. 10(7). Either set of the basic rules contains seven fuzzy rules, but the fuzzy rules for "if $\theta1=$ZR and $\theta2=$NS, then ..." (which are indicated by the shaded areas in the drawings) generate a fuzzy label NS as its result in the case of the set of rules shown in FIG. 12 and a fuzzy label ZR as its result in the case of the set of rules shown in FIG. 13, and these two sets of basic rules thus contain mutually conflicting rule components.

When the rule synthesizer 13 synthesizes a set of rules from the set of basic rules M(ZR,v1) shown in FIG. 12 and the set of basic rules M(NS,v1) shown in FIG. 13 by means of a synthetic arithmetic operation given by M(ZR,v1)+M(NS,v1), the set of basic rules shown in FIG. 12 are given with a higher priority in the intended processing. In other words, when there are mutually conflicting fuzzy rules, the relevant component of the set of fuzzy rules having a lower priority is modified, for instance, from ZR to NS, after fixing the corresponding component (for instance NS) of the set of fuzzy rules having a higher priority, and the amount of modification (NS−ZR) is computed by a subtraction unit. In this case, the amount of modification is NS−ZR=NS, and an addition unit carries out a modification process by adding this amount of modification to the component of each of the other fuzzy rules.

The process of synthesizing a new set of rules from two existing sets of rules may be carried out according to a predetermined set of rules such as the addition rules and the subtraction rules given in FIGS. 4 and 5 in a manner similar to that of the previous embodiment.

FIG. 16 shows the results of modifying the set of basic rules having a lower priority, and the set of rules shown in FIG. 17 are ultimately generated by superimposing the modified set of basic rules over the set of basic rules given in FIG. 12. After modification and addition of rules are carried out by the rule modifier 14 on this set of rules as required, the obtained set of rules are sent to the rule set up unit 15 and are set up on the fuzzy deduction unit.

FIG. 16 shows the process of generating a new set of rules by this rule generator.

First of all, in step 1 (denoted by ST1 in the drawing), a plurality of sets of basic rules which are to be selected from the storage unit 11 by the rule selector 12 for the purpose of synthesis are selected, and the priority of the sets of basic rules serving as a basis for synthesis are determined.

In step 2, after reading the patterns and the components of the rules for the two sets of basic rules serving as a basis for synthesis, the rule synthesizer 13 determines if there are any mutually conflicting rules. If there are no conflicting rules, the program flow advances to step 4 where the fuzzy rules of the sets of basic rules are deployed, and are converted into the forms of the fuzzy language equivalent to if-then statements.

On the other hand, when there are mutually conflicting fuzzy rules, the program flow advances from step 3 to step 5, and, after identifying the conflicting rule of the set of rules having a lower priority and carrying out the aforementioned process of modification, the program flow advances to step 4. In step 4, the fuzzy rules of the set of basic rules having a higher priority are deployed, and are converted into the forms of the fuzzy language equivalent to if-then statements, followed by deployment of the set of modified basic rules having a lower priority.

In step 6, it is determined if there still are any additional sets of basic rules which are to serve as a basis for the process of synthesis. If the result of this determination process is "yes", the program flow returns to step 2, and the above mentioned process is repeated. If the determination result of step 6 is "no", it is then determined whether any modification of the set of rules synthesized in step 7 is required or not. If the result of this determination process is "no", the rules are set up on the fuzzy deduction unit by the rule set up unit 15. However, if the result of the determination process in step 7 is "yes", after the modification and addition of rules are carried out by the rule modifier 14 in step 8, the set of modified rules are set up on the fuzzy deduction unit.

According to this embodiment, since a plurality of sets of basic rules are stored in storage means in advance, a plurality of basic rules are selected from the storage means, and a desired set of rules are generated from the selected sets of rules according to a prescribed rule, generation and setting up of rules and modification of rules for each new application are extremely simplified, and speeded up, thereby allowing a significant reduction of burden on the system operator.

Furthermore, even when there are mutually conflicting rules in the sets of rules serving as a basis for synthesis, one of the sets of rules are modified according to a prescribed rule, destruction of the basic characteristics of the rules during the process of synthesis can be prevented, and other beneficial effects can be obtained.

According to a third embodiment of the present invention which is about to be described in the following, approximate values of the parameters of a control object and an evaluation parameter of the fuzzy rules are received, and a range of fuzzy rules in which the control object can function in a stable fashion is determined from these parameters. The structure for accomplishing this action is denoted by A in FIG. 17. The approximate values of the parameters of a control object which are to be set up on control object parameter set up means 21 may consist of an inertia (M), a viscosity (D) and a torque constant (K) of the control object governed by a differential function $Me'' = -De' + Ku$. The evaluation parameter which is to be set up on evaluation parameter set up means 22 may consist of a parameter $\alpha$ which determines a relation between a deviation e and a time differential value of the deviation $e'$ in a non-negative function of the deviation e and the time differential value of the deviation $e'$ which takes a minimum value when the deviation e and the differential value of the deviation $e'$ are both zero, and monotonically increases with increase in the deviation e. This function is a Liapunov function which gives a sufficient condition for the stability of the system. More detailed discussions on the properties of the Liapunov function and the method for evaluating the stability of a system by appropriately selecting the Liapunov function and evaluating it may be found in pages 291-341 of "Nonlinear Automatic Control" by John E. Gibson, McGraw-Hill, 1963, which is hereby incorporated into the disclosure by reference.

By using such a parameter, it is possible to generate a fuzzy rule plane as illustrated in FIG. 18. Here, if the aforementioned non-negative function is given by $V=(e'+\alpha e)^2$, the condition for the stability of the control object can be expressed by $V' \leq 0$ where $V'$ is the time differential of V. Since $V'=2(e'+\alpha e)(e''+\alpha e')$, the following condition must be met if the action of the control object is to be controlled along the boundary of the first term of the previous equation:

when $e' + \alpha e > 0$, then $\beta e' < u$, and when $e' + \alpha e < 0$, then $\alpha e' > u$.

where $\beta = -(M/K)(\alpha - M/D)$.

By carrying out a control action in this fashion, the control object demonstrates a behavior highly responsive to the deviation but oscillatory as the value of $\alpha$ is increased, and a more controlled behavior when the value of $\alpha$ is made smaller. A preferred value of $\alpha$ is in the order of M/D or slightly larger than that. The adjustment of the value $\alpha$ is the ultimate item of adjustment in determining the behavior of the control object.

In FIG. 18, the region indicated by "p" is examined. The inputs corresponding to this region are e=PS and e'=PM. In other words, the conditions of the fuzzy rules are determined to be "if e=PS and e'=PM", and the corresponding result is determined to be in the region given by "then u>PM". The reason for giving the result in the form of an inequality is that the knowledge of the evaluation parameter determines the sufficient condition, but does not give the necessary condition for the stability of the system. In other words, it can determine a region in which the control object can function in a stable fashion, but does not determine the exact behavior of the control object. Therefore, it is necessary to subsequently determine the ultimate fuzzy rules either automatically or by human judgement of the system operator. In particular, determination of the fuzzy rules in the region (q) of FIG. 18 involves a difficulty as the system stays stable in a broad region extending from "result"=PL to "result"=NM.

Therefore, according to another part of the third embodiment of the present invention, a constraint parameter for constraining the behavior of the control object is received in addition to the control object parameters and the evaluation parameter. A and B in FIG. 17 correspond to these two parts of the third embodiment of the present invention. In B, a constraint parameter is inputted to a fuzzy rule modifier 25 from constraint parameter set up means 24. The constrain parameter determines to what extent the behavior of the control object is to be constrained to a line corresponding to a zero manipulated variable (e'=αe). If all the rules are highly constrained, one can obtain a highly constrained behavior in which the result is given either by PL or NL in addition to ZR when the deviation is zero. FIG. 19 shows such an example of constraint imposed upon the fuzzy rules.

It is also possible to constrain the behavior of the control object by the distances of the parameters from the aforementioned line, or, alternatively, from the origin. The boundaries of the values of the conditions of the fuzzy rules when their distances from the origin (zero deviation) are constrained are given in FIG. 20. In this drawing, the lines (PL, PM, PS) indicated by the broken lines show the boundaries when there is no constraint, and the circles (PLm, PMm, PSm) indicated by the solid lines show the boundaries when the behavior of the control object is constrained by the distance from the origin by the constraint parameter. Since the fuzzy rules are generated in the order of the magnitude of each of their manipulated variables around the origin, it is possible to control the control object with control variables of appropriate magnitudes. The diagram of FIG. 21 shows a rule table in the form of a matrix which determines how the fuzzy rules should be modified according to the selection of the degree of constraint (which in this case consists of three levels, small (S), medium (M) and big (B). This table is stored in the constraint parameter set up means 24 which acts upon the fuzzy rule modifier 25 as shown in FIG. 17.

FIGS. 22 and 23 show the patterns and the contents of the fuzzy rule matrices for different levels of the evaluation parameter $\alpha$ and the constraint parameter, and step responses obtained by the associated sets of fuzzy rules. By thus appropriately adjusting the evaluation parameter $\alpha$ and the constraint parameter, it is possible to obtain desired stable control characteristics.

FIG. 24(A) shows an embodiment of the hardware structure of the fuzzy rule generator according to the present invention. This fuzzy rule generator comprises a small computer controlled by a CPU 30, and is connected to memory 32 and a keyboard 33 via a bus 31, and a display unit 34 via an interface 35. The memory 32 stores programs and arithmetic formulae for computing fuzzy rules, and an operation board 33 is provided with a keyboard and parameter set up dials (see FIG. 24(B)) for allowing the system operator to set up data on the parameters. The display unit 34 displays selected parameters and computed fuzzy rules. The interface 35 is connected to a fuzzy control unit 40.

FIG. 25 shows a block diagram of the fuzzy control unit 40 which comprises a fuzzy deduction unit 41, an output amplifier 46, and adders 47 and 48 for computing deviations e and e'. The adders 47 and 48 receive target values $\theta r$ and $\theta r'$ and actual values $\theta$ and $\theta'$ obtained from the control object. The computed deviations e and e' are supplied to the fuzzy deduction unit 41. The fuzzy deduction unit 41 comprises input units 42 and 43, a main deduction unit 44, and an output unit 45. The deviations e and e' are supplied to the input units 42 and 43, respectively, and, after being scaled appropriately, are evaluated of their degrees of belongingness to membership functions of the conditions as well known to the art of fuzzy control. The degrees of belongingness are supplied to the deduction unit 44, and output values are obtained from corresponding fuzzy rules. These output values are supplied to the output unit 45, and the results obtained therefrom are supplied to the output amplifier 46. The output amplifier 46 supplies a drive current to a motor 49 by a magnitude in proportion to the associated result value to move the control object accordingly. The control object is provided with a position sensor and a speed sensor (not shown in the drawings), and the actual values $\theta$ and $\theta'$ detected thereby are used as negative inputs in the process of addition at the adders 47 and 48.

FIG. 26 is a flow chart showing the operation of the fuzzy rule generator. Inputs of control object parameters and an evaluation parameter ($\alpha$) are received at ST1 and ST2. A stable region of fuzzy rules are computed according to the received parameters (ST3). Thereafter, it is determined whether a constraint parameter has been entered or not (ST4), and, if a constraint parameter has indeed been entered, fuzzy rules conforming with the constraint parameter are determined (ST5). These fuzzy rules are supplied to the main fuzzy control unit (ST6) before the operation of the control unit is concluded. When no constraint parameter has been entered, those fuzzy rules which give rise to minimum output values within a stable region of the fuzzy rules are computed, and they are set as determined rules (ST7) which are to be supplied to the fuzzy control unit (ST6) before concluding this control action.

The step of ST3 corresponds to the action carried out by the basic fuzzy rule generating means A of the diagram given in FIG. 17, and the step of ST5 corresponds to the action carried out by the modified fuzzy rule generating means B given in FIG. 17.

In the above described embodiment, it is possible to determine the constraint parameter automatically according to a predetermined algorithm stored in the control system or manually by the system operator according to the requirements of each specific system.

Thus, according to the third embodiment of the fuzzy rule generator of the present invention, it is possible to generate fuzzy rules which can control the control object in a stable fashion simply by inputting approximate values of parameters and an evaluation parameter of the control object. In particular, by setting up a constraint parameter, it is possible to generate fuzzy rules which can control the control object in a stable fashion. Further, by adjusting the evaluation parameter and the constraint parameter, it is possible to control the behavior of the control object as desired. Thereby, the work involved in setting up fuzzy rules which used to be dependent on the experience of skilled system operators can be automatically carried out, and efficient setting up of fuzzy rules and automatization of fuzzy rule set up can be accomplished.

Although the present invention has been described in terms of specific embodiments, it is possible to modify and replace details thereof without departing from the spirit of the present invention.

What we claim is:

1. A fuzzy rule generator for generating new fuzzy rules based upon a plurality of existing basic sets of fuzzy rules, comprising:
   a memory device for storing said plurality of basic sets of fuzzy rules;
   selection means coupled to said memory device for accessing said memory device and selecting therefrom at least two sets of existing basic sets of fuzzy rules from said stored plurality of existing basic sets of fuzzy rules; and
   a rule synthesizer connected to an output of said selection means which produces a new set of fuzzy rules by combining together the selected at least two basic sets of fuzzy rules in accordance with a predetermined set of rules for combining said selected at least two sets of fuzzy rules to form said new set of fuzzy rules.

2. A fuzzy rule generator according to claim 1 further comprising a fuzzy logic inference device which operates an applied input data using said new set of fuzzy rules.

3. A fuzzy rule generator according to claim 1, wherein said combining of said selected at least two sets of rules consists of adding together said selected at least two sets of rules.

4. A fuzzy rule generator according to claim 1, wherein said combining of said selected at least two sets of rules consists of subtracting from each other said selected at least two sets of rules.

5. A fuzzy rule generator according to claim 1, wherein said rule generating means further comprises:
   means for determining whether said selected at least two basic sets of rules include conflicting rules; and
   means for modifying one of said selected basic sets of rules according to a prescribed rule when said selected basic sets of rules include conflicting rules.

6. A fuzzy rule generator according to claim 1, further comprising a rule modifier connected to said rule synthesizer for imposing a predetermined constraint relating to a control object on said new set of fuzzy rules to ensure a stability of said control object.

7. A fuzzy rule generator according to claim 6, wherein said rule modifier comprises manual input means for modifying a part of said new set of fuzzy rules.

8. A fuzzy rule generator according to claim 7, wherein said rule modifier further includes means for examining a Liapunov function defined for said control object, and means connected to said means for examining for modifying said new set of fuzzy rules so as to ensure stability of said control object.

9. A fuzzy rule generator according to claim 7, wherein said rule modifier further includes means for examining a Liapunov function defined for said control object, and manual input means connected to said means for examining for allowing said new set of fuzzy rules to be manually modified so as to obtain a desired control property within a range of fuzzy rules ensuring a stability of said control object.

10. A method for generating new fuzzy rules based upon a plurality of existing basic sets of fuzzy rules, comprising:
    storing said plurality of existing basic sets of fuzzy rules in a memory device;
    selecting from said memory device at least two sets of said existing basic sets of fuzzy rules from said plurality of stored existing basic sets of fuzzy rules; and
    synthesizing a new set of fuzzy rules by combining the selected at least two sets of fuzzy rules in accordance with a predetermined set of combination rules to form the new set of fuzzy rules.

11. The method of claim 10 further comprising the step of using said new set of fuzzy rules in a fuzzy logic inference device.

12. The method of claim 10, wherein said step of synthesizing a new set of fuzzy rules comprises adding together said selected at least two sets of fuzzy rules.

13. The method of claim 10, wherein said step of synthesizing a new set of fuzzy rules comprises subtracting from each other said selected at least two sets of fuzzy rules.

14. The method of claim 10, further comprising the steps of:
    determining whether said selected at least two basic sets of rules include conflicting rules; and
    modifying one of said selected basic sets of rules according to a prescribed rule when said selected basic sets of rules include conflicting rules.

15. The method of claim 10, further comprising the step of imposing a predetermined constraint on said generated new set of fuzzy rules to ensure a stability of a control object.

16. The method of claim 15, wherein said predetermined constraint is used to modify a part of said generated new set of rules.

17. The method of claim 15, wherein said step of imposing a constraint comprises the steps of:
    examining a Liapunov function defined for its control objects; and modifying said generated new set of fuzzy rules in accordance with said examined Liapunov function so as to ensure stability to said control object.

18. The method of claim 15, herein said steps of imposing a constraint comprises the steps of:

examining a Liapunov function defined for its control object; and manually modifying said generated new set of fuzzy rules in accordance with said examined Liapunov function used to obtain a desired control property with a range of fuzzy rules for ensuring a stability to said control object.

* * * * *